UNITED STATES PATENT OFFICE.

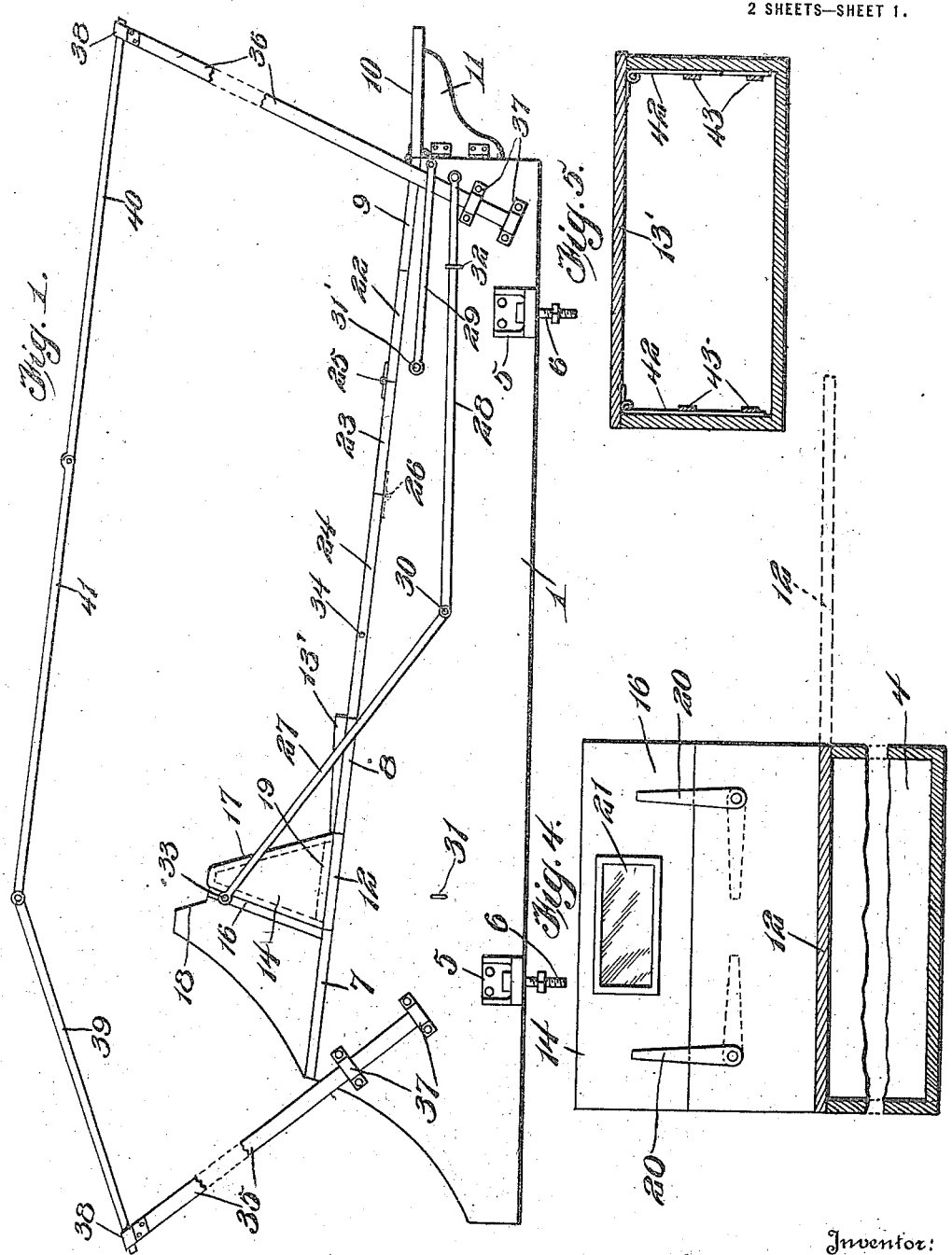

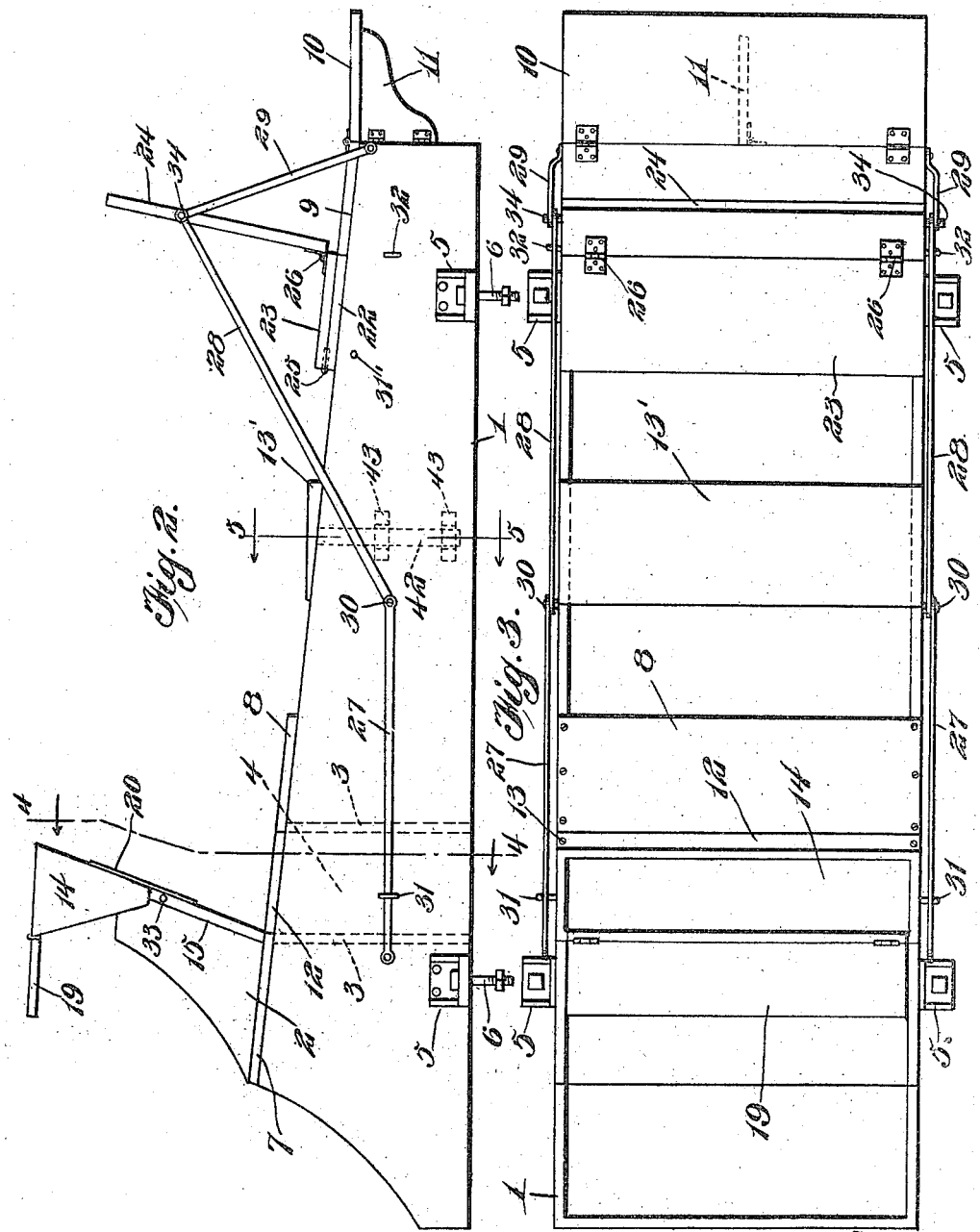

ALFREDO SERRATOS, OF WASHINGTON, DISTRICT OF COLUMBIA, ASSIGNOR OF ONE-HALF TO WILLIAM H. BURKE, OF WASHINGTON, DISTRICT OF COLUMBIA.

VEHICLE-BODY.

1,249,214.  Specification of Letters Patent.  Patented Dec. 4, 1917.

Application filed July 18, 1916. Serial No. 109,910.

*To all whom it may concern:*

Be it known that I, ALFREDO SERRATOS, a citizen of the Republic of Mexico, residing at Washington, District of Columbia, have invented certain new and useful Improvements in Vehicle-Bodies, of which the following is a specification, reference being had therein to the accompanying drawing.

This invention relates to improvements in vehicle bodies, and its primary object is to provide a vehicle body which may be mounted upon any desired type of running gear and which is particularly adapted for the use of campers, mail or despatch carriers, explorers, prospectors, surveyors, construction engineers, various branches of military field service, hospital corps, etc., whereby multifold conveniences may be afforded to those engaged in travel, transportation and general field work.

A further object of the invention is to provide a vehicle body which is simple, light, strong and durable in construction, and which is conveniently convertible to serve different purposes, as hereinafter fully described.

In the accompanying drawings illustrating the invention:

Figure 1 is a side elevation of the body as adapted for use as a bed, ambulance or platform wagon, the canopy or top support being arranged in position for use;

Fig. 2 is a similar view of the body as adapted for use as a multi-seat with dining table;

Fig. 3 is a top plan view of the body as shown in Fig. 2;

Fig. 4 is a vertical transverse section on the line 4—4 of Fig. 2;

Fig. 5 is a vertical transverse section on the line 5—5 of Fig. 2.

In the practical embodiment of my invention, I provide a body 1 of generally oblong rectangular form and preferably having its upper portion sloping in a downward and rearward direction, as shown. At the forward end of the body is arranged a fixed or stationary seat 2 and formed upon the interior of the body by spaced vertical partitions 3 immediately in rear of said seat is a compartment 4 designed especially for use as a secret storage compartment, in which private papers or the like may be kept. The interior of the body, with the exception of the compartment 4, may be suitably formed or divided for the storage of goods, provisions or paraphernalia of various kinds according to the purpose for which the vehicle is to be used. Brackets 5 are provided upon the body for the passage of bolts or other suitable fastenings 6, whereby the body may be secured to the running gear or chassis of the vehicle. It will, of course, be understood that the vehicle may be drawn or propelled by animal or motive power of any desired or suitable kind.

The top of the body is provided with fixed transverse boards or sections 7, 8 and 9, the board or section 7 forming the seat proper, and at its rear end the body is provided with a hinged extension board 10 which is adapted to be out-turned and supported by hinged brackets 11, so that the upper surface of the body may be elongated when used as a bed or stretcher or for other analogous purposes. When not in use the board 10 may be folded over upon the top of the board 9 and the brackets 11 folded against the rear end of the body, as will be readily understood. A sliding top or cover 12 is provided for normally closing the secret compartment 4, and this cover 12 is slidably mounted between the boards 7 and 8 for lateral removal in either direction. Suitable imitation fastenings 13, such as false screws, may be employed to simulate the appearance of real fastenings and thus make the cover 12 appear, like the boards 7, 8 and 9, as fixed boards, whereby the presence of the compartment 4 may be concealed. The compartment 4, as stated, may be employed to hold private papers, securities or valuables, or for holding military despatches and other articles of a personal or private nature.

The board 13' is provided to normally rest upon the fixed top board 8 and is preferably wedge shaped in cross section, so that it may serve as a seat which is level or substantially horizontal. In the normal arrangement of the parts, as shown in Fig. 1, this leveling or seat board is arranged immediately in rear of a swinging box or receptacle 14, which may be employed for holding toilet articles, table silver or analogous elements of the carried equipment. The back 15 of the seat is upwardly and rearwardly inclined, as shown, and the receptacle 14 is preferably V-shaped so as to provide an inclined front wall 16 to rest against the back 15 and an inclined rear wall 17 which may serve as a back rest for the person or persons using the seat board or leveler 13. The receptacle 14 is hinged at its vertex to the upper rear portion of the back 15, and the sides of the front seat are recessed, as shown at 18, to receive such portion of the receptacle and to allow said receptacle to be swung upwardly, as shown in Fig. 2, to a position in which it allows access to the cover 12 of the compartment 4. The receptacle 14 is open at its base or bottom and normally closed by a hinged cover 19, which is adapted, when the receptacle is swung downwardly to normal position, to rest upon the cover 12 and further aid in concealing the existence of the compartment 4. Hinged latches 20 are provided upon the back 15 for holding the receptacle 14 elevated when desired, and when in an elevated position the door 19 of said receptacle may be thrown forwardly to serve as a canopy top or hood to shield the occupant of the seat 2 from the heat of the sun, etc. When in normal position the surface 17 of the receptacle 14 may further serve as an inclined support for a pillow or other article so that a person occupying the seat 13 may be comfortably supported in an inclined position. A mirror 21 may be provided upon the surface 16 of the receptacle 14 so as to be exposed to use when said receptacle is swung upwardly and secured.

Arranged upon the top of the body between the fixed boards 8 and 9 is a combined door or cover, admitting access to the interior of the body, and seat, which combined door and seat comprises a fixed section 22 and hinged sections 23 and 24, the section 23 being hinged on its upper side to the section 22, as indicated at 25, and to the section 24 on its under side, as indicated at 26, so that the sections 23 and 24 may be swung downwardly for coöperation with the fixed sections 7, 8 and 9 to close the top of the body and form an upper deck or platform, and so that when desired the section 23 may be swung backwardly over upon the section 22 and the section 24 supported in an upright position, to respectively form a rear seat and back rest, as shown in Fig. 2. When said combined cover and seat is arranged in the position shown in Fig. 2, the board 13 may be placed in an intermediate position between the boards 8 and 22 to serve as a dining or other table top which may be employed with equal convenience by persons seated upon the boards 8 and 23.

It will be observed that when the boards which normally close the top of the body are arranged in the normal position shown in Fig. 1, the said boards provide a sloping platform which adapts the body to be used either as a bed or ambulance or to support baggage or other impedimenta which cannot be conveniently stored or transported within the body. Braces are provided for holding the seat member 23 in an erect position and to also serve as side seat guards or hand rails, and such braces comprise front intermediate and rear rods 27, 28 and 29. These rods are formed at their opposite ends with eyes, and the eyes at the forward ends of the rods 8 and rear ends of the rods 27 are pivotally connected with the sides of the body, as indicated at 30, and keeper members 31 and 32 are adapted to receive and support the respective rods 27 and 28 when swung downwardly in an inactive position, the eyes of the rods 29 being secured, when such rods are not in use, to bolts or supporting members 31' on the sides of the body. Bolts 33 are provided upon the seat back 15 to engage the eyes at the forward ends of the rods 27 to hold said rods in an inclined position, as shown in Fig. 1, in which position the rods will serve as side guides and arm rests for the person or persons occupying the seat board 13. The board 24 is provided with bolts 34 for respective engagement with the eyes at the rear ends of the braces 28 and forward ends of the braces 29, so that these braces may be swung upwardly to the position shown in Fig. 2 on their opposite end pivots to support the board 24 in an elevated position, in which position the rods 28 and 29 may respectively serve as side guards or arm rests for persons occupying the seat 23 and using the board 9 or extension board 10 as a seat, it thus being obvious that provision will be made so that the occupants of seats may secure a firm hold against liability of being thrown off when the vehicle is traveling over a rough road or surface. In the use of the various adjustable parts mentioned, it will be apparent that the elements may be arranged in position to serve the various uses mentioned in an easy, ready and convenient manner.

It will of course be evident that in the place of pivot bolts rivets may be used and that in place of fastening nuts retaining pins or keys of a suitable type may be employed to secure the rods in adjusted positions.

Should it be desired to provide a canopy top or shade cover for the vehicle, this may be furnished by the use of front and rear sets of staves 35 and 36 which may be detachably fitted in loops or sockets 37 upon the sides of the vehicle and provided at their upper ends with sockets or loops 38 to receive the free ends of front and rear rods 39 and 40 jointed to or pivotally united by intermediate rods 41, which rods may be extended longitudinally over the top of the vehicle, as shown in Fig. 1, to receive any suitable type of top cover by means of which the occupants of the vehicle may be shaded and protected from the elements. When not in use the rods 39, 40 and 41 may be removed and stored with the staves and cover within or upon the vehicle body in any suitable or well known manner. If desired, the board 13 may be provided with hinged bracing arms 42 adapted to be folded upon the under side of said board when disposed in the position shown in Fig. 1 and to be turned down and engaged with keeper loops 43 upon the interior of the body when said board is disposed in the position shown in Fig. 2.

From the foregoing description, taken in connection with the drawings, the construction and mode of use of my improved vehicle body will be readily understood, and it will be seen that the invention provides a body which is adapted for the various uses set forth in a ready and convenient manner, so as to provide for varying contingencies and to serve effectually for allowing goods to be transported and passengers carried with facility, as well as to provide sleeping accommodations and a proper couch for the sick or injured. The body will be found of manifold advantages and convenience to those engaged in surveying or other field work, prospecting, exploring and general military and hospital services, as well as for despatch or express transportation where the use of a concealed compartment will afford security in transporting valuable papers and packages. The board 24 may, if desired, be made of metal or other material and used as a bullet-proof shield in case the vehicle is used for military purposes, in which event also the vehicle may be provided with a rapid-firing gun for offensive or defensive work.

Other conveniences, advantages and uses of the invention will be apparent.

Having thus described my invention, I claim:

1. A vehicle body having a compartment therein, a cover therefor, a movable compartment adapted to rest upon said cover, and means for holding said movable compartment elevated with respect to said cover.

2. A vehicle body having a seat, a compartment below and in rear of the seat, a closure for said compartment, and a second compartment movably mounted to conceal and expose the cover of the first named compartment.

3. A vehicle body having a seat, a compartment arranged below and in rear of said seat, a cover for said compartment, and a second compartment hingedly mounted for movement so as to rest upon or to be swung clear of the cover of the first named compartment.

4. A vehicle body having a seat, a fixed top board in rear of said seat and in spaced relation thereto, a compartment opening through the space between said seat and board, a detachable cover adapted to be disposed between the seat and board to close said compartment, a second compartment movably mounted to normally rest upon and conceal said cover and to be swung to a position to expose said cover, and means for holding said second named compartment in the second named position.

5. A vehicle body having a seat, a fixed board in rear of the seat and spaced therefrom, a compartment within the body having an entrance-way between said seat and board, a closure for said entrance-way, a movable compartment adapted to be disposed above said cover to conceal the same and to be swung upwardly to a vertical position to expose said cover, means for holding said movable compartment in the second named position, and rods upon the body adapted to be swung upwardly for engagement with the back of the seat to serve as braces and arm rests.

6. A vehicle body having fixed portions at its top, movable portions between the same adjustable to form seats and to expose the intervening space, and a board adapted to be disposed in said space to form a table or like support.

7. A vehicle body having front and rear movable portions adjustable to form seats or covers, and rods hinged to the sides of the body and adjustable to form side guards and arm rests for the respective seats.

8. A vehicle body having a seat, a compartment below and in the rear of said seat, a fixed board spaced from said seat, and an apparently fixed cover for said compartment, but slidably fitted between said seat and fixed board.

9. A vehicle body having a seat, a movable compartment normally disposed at the rear of said seat, means for holding said compartment elevated, and a cover for said compartment adapted to provide a canopy top for the seat, in open position with the compartment elevated.

10. A vehicle body having a seat, a movable compartment normally disposed at the rear of said seat, latch elements pivoted upon the back of said seat and adapted to engage said compartment to hold the latter elevated.

11. A vehicle body having a seat, a fixed board arranged at the rear of said seat and spaced therefrom, and a movable compartment normally disposed at the rear of said seat and defining a back rest for said fixed board, the latter providing an auxiliary seat.

12. A vehicle body having a seat, a fixed board spaced rearwardly therefrom and providing an auxiliary seat, a movable compartment normally arranged at the rear of the seat proper and defining a back rest for said auxiliary seat, and means for holding said compartment elevated.

13. A vehicle body having a seat, a fixed board spaced rearwardly therefrom and providing an auxiliary seat, a movable compartment normally disposed at the rear of the seat proper and defining a back rest for the auxiliary seat, a mirror attached to one side of the movable compartment, and means for holding the compartment elevated, whereupon said mirror is exposed.

14. A vehicle body having a downwardly and rearwardly sloping upper surface, fixed portions at the top, movable portions between the same and adjustable to form seats to expose the intervening space, and a board wedge-shaped in cross section normally arranged on one of said sections constituting a seat, and adapted to be disposed in said space to form a table or like support.

15. A vehicle body having fixed and movable cover portions, a hinged section normally engaging the rear end of said body, and means for supporting said section horizontally to provide for a continuation of the cover.

16. A vehicle body having front and rear movable portions adjustable to form seats or covers, pivotally connected rod sections mounted on the sides of the body and independently adjustable to form side guards or arm rests for either of the respective seats.

17. A vehicle body having fixed and movable cover portions, the movable portions being adjustable to form seats, and means supported on the sides of the body and adjustable for detachable engagement with the movable portions to brace said seats in said position.

18. A vehicle body having fixed portions at its top, movable portions between the same adjustable to form seats and to expose the intervening space, a board adapted to be disposed in said space to form a table or like support, and means carried by said board and coöperating with means on said body for holding said board fixed relatively to the latter.

In testimony whereof I hereunto affix my signature in the presence of two witnesses.

ALFREDO SERRATOS.

Witnesses:
 ODEN B. GRAY,
 WILLIAM H. BURKE.

Copies of this patent may be obtained for five cents each, by addressing the "Commissioner of Patents, Washington, D. C."